Jan. 28, 1958 J. BALL ET AL 2,821,635

PHOTO TIMING CIRCUIT

Filed Dec. 21, 1954

INVENTORS
JACK BALL
GUNTER G. WILKENS
BY
Hyde, Meyer, Baldwin & Doran
ATTORNEYS 2,821,635
Patented Jan. 28, 1958

2,821,635

PHOTO TIMING CIRCUIT

Jack Ball, Chesterland, and Gunter G. Wilkens, Shaker Heights, Ohio, assignors to Picker X-Ray Corporation Waite Manufacturing Division, Inc., Cleveland, Ohio, a corporation of Ohio Application December 21, 1954, Serial No. 476,818
5 Claims. (Cl. 250—95)

This invention relates to improvements in a timing circuit responsive to the output of a photoelectric cell wherein the cell is responsive to light of a pulsating frequency, resulting in an electrical output from the photoelectric cell including a substantially constant dark current component and an alternating current component.

One of the objects of the present invention is to provide electric circuit means connected with the output of such a photoelectric cell for separating the two current components, together with electrical circuit means receiving the alternating current component as input and having its output operatively connected with a control circuit.

Another object of the present invention is to provide means for timing an X-ray photograph including a photoelectric cell adapted to receive light from a fluorescent surface responsive to the X-ray image, the output of this cell being responsive to the light from the fluorescent surface which is in wave form and which includes a substantially constant dark current component and an alternating current component, together with electric circuit means connected in the output circuit of the photoelectric cell for electrically separating the components, amplifying the alternating current component and utilizing such resulting current for terminating the X-ray exposure.

A further object of the present invention includes the means for timing an X-ray photograph as described in the preceding paragraph wherein the fluorescent surface gives off a light of wave form of a predetermined frequency and wherein the electrical circuit means for receiving the alternating current component from the photoelectric cell has electrically connected in series with it an amplifier for the alternating current and a rectifier and a trigger tube responsive to the output of the rectifier, there being a transformer coupling between the amplifier and the rectifier, and this coupling being tuned to the same predetermined frequency so that the timing system is relatively insensitive to any high frequency surges generated.

Still a further object of the present invention is the provision of a booster circuit for introducing a voltage in series with the output signal so as to shorten long exposure times which might otherwise result in too dark X-ray photographs on heavier patients or long exposures.

Other objects and advantages of the present invention will be apparent from the accompanying drawings and description and the essential features thereof will be set forth in the appended claims.

In the drawings,

Fig. 1 is an electrical diagram illustrating a typical X-ray photo timing circuit utilizing our invention;

Fig. 2 is a diagram of an X-ray exposure control circuit utilized in connection with the wiring illustrated in Fig. 1; while Fig. 3 is a graph illustrating the substantially constant dark current component and alternating current componet appearing as output from the photoelectric cell utilized in Fig. 1.

Figures 1, 2, 3:
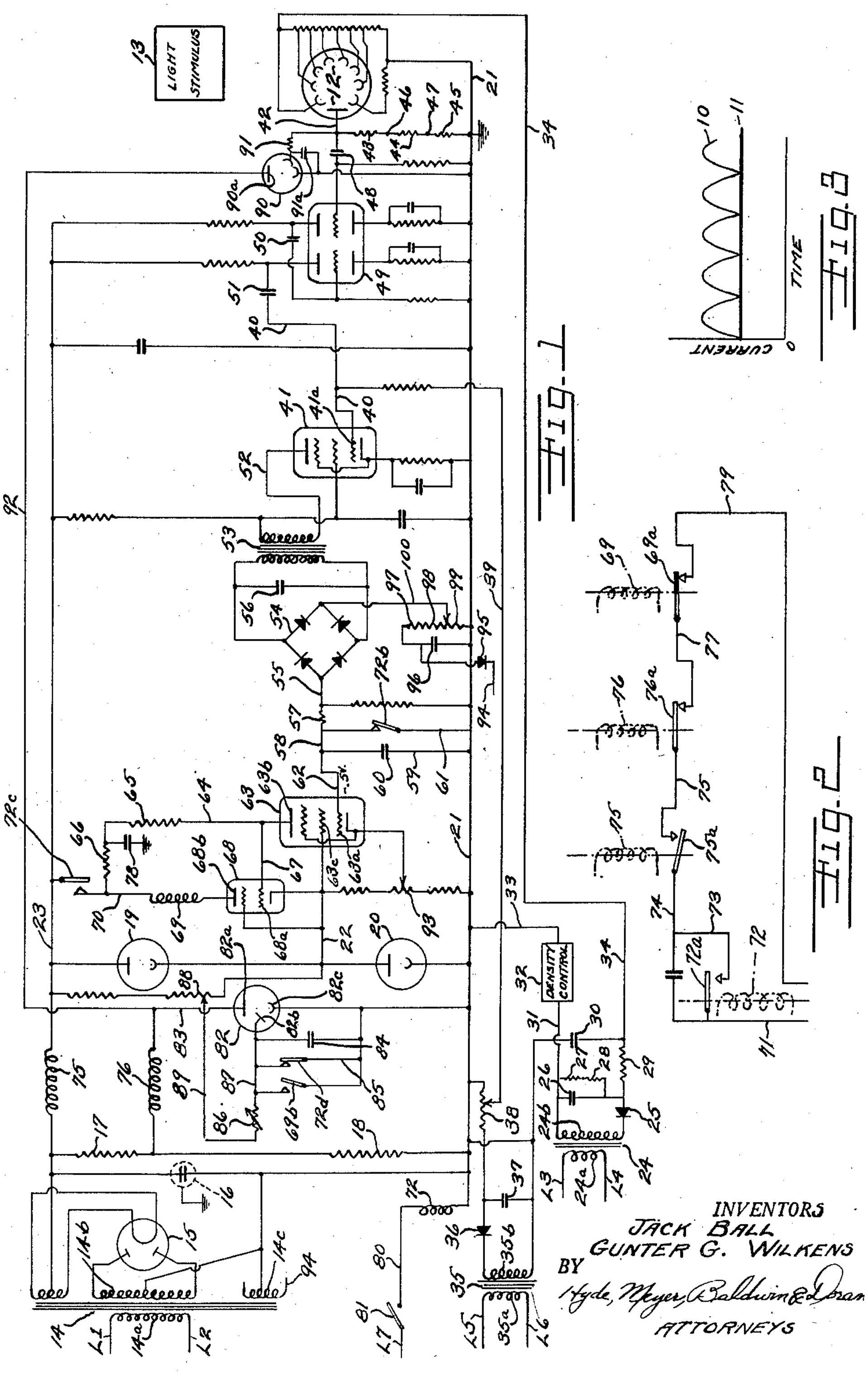

The output of an X-ray tube, whether it be self-rectified or full wave rectified, consists of a series of pulses, each being one one-hundred-and-twentieth of a second long (when using 60-cycle current) and having the shape of half of a sine wave. That is, this pulse would start at zero and go up to a maximum and come down to zero again every one-hundred-and-twentieth of a second, as shown in the curve 10 of Fig. 3. In self-rectified or half-wave circuits, there would only be half of this number of pulses. That is, there would be a pulse of one-hundred-and-twentieth of a second and then there would be no pulse for the next one-hundred-and-twentieth of a second. This alternating current component as illustrated in the graph of Fig. 3 by the line 10, is superimposed upon a dark current which is substantially constant and which is represented by the line 11 on the graph of Fig. 3. Hereinafter, reference will be made to spot film devices, by which is meant the selection on a fluorescent screen of a portion of an X-ray image to be photographed, the scanning of this spot by means of one or more photoelectric cells, and the use of the output of the photoelectric cell to time the X-ray photograph. Such a device is shown in the copending application of Jack Ball and John J. Russell, Serial No. 267,281, filed January 19, 1952, for Photo Timer. It is a known fact that as you increase the voltage to a photo tube, the dark current increases considerably. In the past, in order to obtain sufficient sensitivity for spot film work, it was necessary to raise the voltage applied to the photoelectric cell. Many times, utilizing the devices of the prior art, one would encounter a situation of either no dark current and insufficient sensitivity, or of sufficient sensivity but too much dark current. The present application provides means for electrically separating the substantially dark current component as represented by line 11 of Fig. 3 and the alternating current component as illustrated by the line 10 of Fig. 3, and the use of an alternating current amplifier between the photoelectric cell and the trigger circuit which stops the X-ray exposure after the desired timing interval.

At the right-hand side of Fig. 1, there is seen a photoelectric cell 12 which is in position to view a light stimulus 13 which in the present instance is a fluorescent screen responsive to X-rays and, therefore, giving forth a pulsing wave of light responsive to the 60 cycle current with which the X-ray tube is energized. Figs. 1 and 2 show a typical wiring diagram for the utilization of our invention in connection with the timing of an X-ray exposure.

At the left-hand side of Fig. 1, there is illustrated three different power supplies. The source L1, L2 is 120 volts 60 cycle alternating current, stabilized, to provide a low voltage power supply for supplying the filament voltage for all of the tubes in the circuit and to supply the D. C. voltage for the operation of the amplifier and trigger circuit. This source supplies the primary **14*a* of the transformer 14. The secondary 14*b* of this transformer supplies 350 volts to the plates of the rectifier tube 15 which supplies D. C. voltage to a filter condenser 16. This gives a voltage from 330 to 370 volts depending upon the output from the stabilized source. Across this condenser there is a voltage divider comprised of the two resistors 17 and 18. This feeds two voltage regulator tubes 19 and 20. The line 21 is grounded and the tube 20 maintains 105 volts between lines 21 and 22 while tube 19 holds a potential of 155 volts between line 22 and line 23** for the amplifier circuit.

The high voltage supply for the timing circuit is provided through transformer 24 whose primary **24*a* is supplied by a stabilized 120 volt 60 cycle source indicated at L3, L4. The secondary 24*b* of this transformer supplies a high voltage selenium rectifier 35 which delivers a potential of the order of 1000 volts to the filter condenser 26**.

Across this filter condenser there are two resistors 27 and 28 in series which are bleeder resistors for discharging the high voltage when the timer is switched off. Additional filtering for this high voltage supply is provided by the resistor 29 and the additional condenser 30. One side of this high voltage supply is grounded through line 31, density control 32 and line 33. The other side of the high voltage supply is connected through line 34 with the photo cell 12.

A third power supply is for the kilovoltage compensation. Here the source L5, L6 is responsive to the kilovoltage selected on the X-ray tube which energizes the fluorescent screen 13 and may vary from zero to 220 volts. This source supplies the primary 35*a* of the transformer 35, the secondary of which 35*b* supplies a selenium rectifier 36 and a filter condenser 37. Across the D. C. supply is a 100,000 ohm potentiometer which applies a variable voltage, responsive to the kilovoltage of the X-ray exposure, through lines 39 and 40 to the grid 41*a* of the variable MU tube 41 as will later appear. This voltage is adjustable through variable resistor 38.

The output of the photo tube 12 is fed through line 42 to the voltage divider consisting of the resistances 43, 44 and 45. The connection shown in Fig. 1 is for maximum voltage and maximum sensitivity when used with the spot film device. The photo tube input is connected at the point 46 for use with a Bucky which gives less voltage and less sensitivity, while a photo tube used in connection with the cassette changer is connected at point 47 and gives still less voltage and sensitivity. Line 21 is grounded as previously mentioned. The substantially constant dark current component of the output of the photo cell is transmitted through the resistance to ground. The alternating current component of this voltage is transmitted through the coupling condenser 48 to the first grid of amplifier tube 49. This signal is amplified in the first plate of the amplifier tube and is then coupled through condenser 50 to the second grid of the tube which again amplifies the signal in the second plate whose output is coupled through condenser 51 to the grid 41*a* of the tube 41 through line 40. The output of this tube is connected through line 52 to the primary of transformer 53. The secondary of this transformer feeds through a rectifier 54 which provides a D. C. voltage in line 55 which may be as high as 200 volts with respect to the ground 21. It should be noted that the output of the transformer 53 is tuned by condenser 56. Since we are only interested in amplifying a 120 cycles per second pulse, corresponding to the light stimulus 13, we tune the output circuit of this transformer 53 to this frequency so that the system will be relatively insensitive to any high frequency surges generated. Line 55 is connected through resistance 57, lines 58 and 59 and condenser 60 to ground. Resistance 57 and condenser 60 are selected according to the technique desired. Condenser 60 is normally shunted to ground through line 61 and switch 72*b*. Line 62 conducts the charge from condenser 60 to the grid 63*a* of the control tube 63. The charge on condenser 60 starts at zero when switch 72*b* is opened and builds up to approximately minus 0.5 volt. The output from plate 63*b* of tube 63 is connected through line 64 and resistance 65 and 66 through switch 72*c* to line 23 when an exposure is going on. Line 64 is connected through line 67 to the grid 68*a* of the trigger tube 68. The screen grid 63*c* of tube 63 is connected to line 22 which is held at 105 volts by the voltage regulator tube 20 as previously described. With grid 63*a* at zero voltage, lines 64 and 67 are approximately 85 volts. As the charge on grid 63*a* builds to about minus 0.5 volt, the voltage in line 64 goes up to approximately 105 volts and, of course, at the same time the voltage across 65 and 66 goes down. Thus the voltage in line 67 builds up gradually to approximately 105 volts. This will cause trigger tube 68 to fire and the plate circuit from plate 68*b* is connected through relay 69 and line 70 and switch to line 23. This relay 69 is utilized to stop the normal exposure as will presently appear.

Fig. 2 represents diagrammatically an electrical circuit for energizing the X-ray tube which produces the fluorescence on screen 13. In the circuit of Fig. 2, line 71 is connected through switch 72*a* (normally open until an exposure is started) through lines 73 and 74, normally open switch 75*a*, line 75, normally closed switch 76a, line 77, and normally closed switch 69*a* to line 79.

Switch 72*a* is energized by relay 72 which is in series between lines 80 and 21 through exposure switch 81 which is connected with the source L7 which is preferably 110 volts D. C. current. Switch 72*b* is another switch responsive to relay 72. Switch 72*c* is also responsive to energization of relay 72.

Switch 75*a* is closed by energization of relay 75 which is in series between one of the windings of transformer 14 and line 23. The purpose of this relay and switch is to insure the supply of power on the amplifier circuit before switch 75*a* is closed to enable an exposure.

Switch 69*a* is opened by energization of relay 69 previously mentioned at the end of a normal exposure.

We have incorporated a back-up timer by means of trigger tube 82 which is for the purpose of terminating an exposure in case the trigger tube 68 does not fire in the normal course of events. The plates 82*a* of this tube is connected through line 83 with relay 76 which in turn is connected to the junction between resistance 17 and 18. This puts about 180 volts maximum across tube 82 which is insufficient to cause it to fire from plate to cathode. Between the starter anode 82*b* and the cathode 82*c* there is connected a timing condenser 84. This condenser is normally shorted through line 85 and switch 72*d* which is another one of the switches controlled by relay 72. Switch 72*d* is normally closed but opens when exposure starts which also starts the charging of condenser 84. For the purpose of picking out various back-up times, a variable resistor 86 is connected with the starter anode by line 87 and with the voltage divider 88 by means of line 89. The normally open switch 69*b* is controlled by relay 69 so that when the exposure is properly photo timed and terminated by the trigger tube 68, relay 69 is energized and causes switch 69*b* to close which shuts off the back-up timer and discharges trigger tube 82.

A light safety trigger tube 90 is provided to terminate a timing cycle in case excessive light strikes the photo tube 12 as for instance to much light in the room where the exposure is being made. The charge on the starter anode of this tube is supplied through resistance 91. Its plate circuit 91*a* is connected through line 92 to relay 76 so that firing of tube 90 will also open switch 76*a* and terminate an exposure which may have been started.

It should be mentioned here that the control tube 63 is protected by resistance 66 and condenser 78 which provide an RC network to keep out transients. The plate current of tube 63 is determined by the setting of the cathode resistor 93. This gives a sensitivity control and is accessible from the front of the timer for setting.

It is a characteristic of the present timer that it provides shorter times for the thin patient and longer times for the thick patient automatically. To prevent the longer times from becoming too long, there is incorporated what we have termed a booster circuit. Without this booster circuit it is possible to have the long exposure times too long, resulting in too dark films on the heavier patients or on long exposures. By means of this booster circuit, we introduce a voltage in series with the output signal so as to cut down this effect. It has no effect whatsoever on the shorter timed exposures. This circuit takes the voltage between the center tap of the transformer winding 14*c* and the tap 94. This circuit is seen just below the rectifier 54 in Fig. 1. The voltage is supplied to a selenium rectifier 95 and to a filter condenser 96 in parallel with a resistance network 97, 98 and 99. Resistance 98 has an adjustable strap 100 so that the voltage from this adjustable connection to ground can be adjusted in the neighborhood of 0.5 to 0.6 volt. For long exposures, the signal voltage is in the order of 1 volt so that this booster voltage is comparable with respect to it. However, on short exposures, the output voltage may be as high as 100 volts. Hence, this booster voltage is negligible on these short exposures.

The operation of our improved timer will now be explained. It will be understood that a patient will be in position for examination with the X-ray tube on one side of the portion of the body to be examined and the fluorescent screen 13 on the opposite side of the body in position to receive the X-ray image. With our improved timer in standby condition, the low voltage power supply L1, L2 is energized and the kilovoltage compensation circuit L5, L6 is energized. The energization of the low voltage supply causes relay 75 to be energized which closes the normally open switch **75*a*. When the exposure is started by operation of switch 81, full voltage is applied to the photo tube 12. At the same time some voltage is supplied in the circuit L3, L4 which supplies high voltage to the photo tube. Customarily, we initially apply voltage through a 3000 ohm resistor, and with operation of a relay we apply full voltage. This method is a little better than going from no voltage to full start on the photo tubes because we get more consistent timing operations. Therefore, with all conditions properly arranged, the exposure is started by means of closing the switch 81 which energizes relay 72 which actuates the switch 72*a* to close the same to start an exposure. This may also open 72*b* although, preferably, the switch 72*b* is placed in series with the switch 72*a* so that there is an infinitesimal delay between the closing of switch 72*a* and the opening of switch 72*b* which starts the charging of condenser 60. This delay in opening switch 72*b* avoids surges introduced into the grid of tube 63 which would give erratic timing. Another armature of relay 72 closes switch 72*c* which completes the circuit to the trigger tube 68. Still another armature of relay 72 opens switch 72*d* so as to start condenser 84 charging. The operation of these various relays completes the circuit from line 71 to line 79 which is in the energizing circuit of the X-ray tube and starts the X-ray exposure. The fluorescent screen 13 is viewed by the photo tube 12 and a current proportional to the intensity of the fluorescent screen flows from the photo tube. This gives a voltage drop across the resistance divider 43, 44, 45. The alternating current component of this voltage is transmitted through the coupling condenser 48 through the amplifier tube 49 and tube 41, transformer 53 and rectifier 54 to provide there a D. C. signal. This signal charges condenser 60, which charge is applied to the grid of tube 63 and makes the potential of grid 63*a* increasingly negative. When the charge on condenser 60 and the potential of grid 63*a* goes to approximately minus 0.5 volt, the exposure is terminated by the firing of the trigger tube 68 which energizes relay 69 and opens switch 69*a* to terminate the exposure. In standby position, the cathode of tube 68 is 105 volts plus, and the grid 68*a* of this tube is approximately 85 volts with respect to ground. This latter condition is determined by the current flowing through tube 63 and this is controlled by the sensitivity rheostat 93 in the cathode circuit of tube 63. Increasing resistance 93 raises this voltage. Decreasing resistance 93** lowers this voltage.

The kilovoltage compensation has been made sufficient for all practical purposes, especially when using a low kilovoltage. The compensation is not linear, but increases more at low values of the kilovoltage as is required. For instance, at 60 volts in the high tension primary of the transformer supplying the X-ray tube as well as at the source L5, L6 here shown, the D. C. output at line 55 is about 65 volts. Again at 100 volts in the high tension primary the D. C. output at the same point is 43 volts. These two values lie approximately on a straight line. However, at 180 volts in the high tension primary the signal is 22 volts D. C. at line 55 while at 220 volts in the high tension primary the same D. C. signal is 16 volts. These two latter values do not lie on the straight line previously mentioned. This kilovoltage compensation is set to give approximately 45 volts bias on grid **41*a* of tube 41** with 220 volts in the high tension primary.

To show the effect of the booster whose input was described at line 94, with the booster circuit adding approximately 0.6 volt at line 100, when the D. C. signal at line 55 is 100 volts, the exposure time is 0.15 second both with and without the booster voltage. When the D. C. signal at line 55 is 10 volts, the exposure time is 1.25 seconds without the booster and 1.20 seconds with the booster. When the D. C. signal at line 55 is 1 volt, the exposure time without the booster circuit is 20.8 seconds, and with the booster is 11.5 seconds.

With our improved photo timer we have good sensitivity under nearly all conditions and if the timer is set to give the correct density on a film while X-raying thin patients, then heavy patients will also have correct density of film exposure.

What is claimed is:

1. Means for timing an X-ray photograph including a photoelectric cell adapted to receive light from a fluorescent surface, the output of said cell responsive to light of wave form including a substantially constant dark current component and an alternating current component, electric circuit means connected in the output circuit of said cell for electrically separating said components, and electrical circuit means responsive to said alternating current component only for terminating an X-ray exposure.

2. The combination of claim 1 wherein said last named circuit means includes amplifier means for said alternating current component, a trigger tube responsive to the output of said amplifier means, and means for terminating an X-ray exposure responsive to firing of said trigger tube.

3. A control circuit comprising a photoelectric cell having an electrical output responsive to light, said output including a substantially constant dark current component and an alternating current component, electric circuit means connected with said cell output for separating said components, and electrical circuit means receiving said alternating current component only as input and having its output operatively connected with a control circuit.

4. In the combination of a photoelectric cell and a light stimulus energized by electrical current of a predetermined frequency, the output of said cell responsive to said light including a substantially constant dark current component and an alternating current component of said predetermined frequency; the combination therewith of electric circuit means connected with said cell output for separating said components, electrical circuit means receiving as a signal said alternating current component only as input and having electrically connected in series an amplifier for said alternating current input and a rectifier and a trigger tube responsive to the output of said rectifier, there being a transformer coupling between said amplifier and said rectifier, said coupling being tuned to said predetermined frequency, and X-ray control means operatively connected with said trigger tube.

5. In the combination of a photoelectric cell and a light stimulus energized by electrical current of a predetermined frequency, the output of said cell responsive to said light including a substantially constant dark current component and an alternating current component of said predetermined frequency; the combination therewith of electric circuit means connected with said cell output for separating said component, electrical circuit means receiving as a signal said alternating current component only as input and having electrically connected in series an amplifier for said alternating current input and a rectifier and a trigger tube responsive to the output of said rectifier, and means for speeding up the operation of said trigger tube mainly on longer time cycles and including means for adding a voltage to said signal of the order of a small fraction of the electrical value of said signal on short time cycles.

References Cited in the file of this patent

UNITED STATES PATENTS

| | | |
|---|---|---|
| 2,347,015 | Woloschak | Apr. 18, 1944 |
| 2,476,389 | Schmidt | July 19, 1949 |
| 2,673,935 | Waldhauer | Mar. 30, 1954 |